(12) United States Patent
Liao et al.

(10) Patent No.: US 11,420,664 B2
(45) Date of Patent: *Aug. 23, 2022

(54) SHELF BOARD AND CART INCLUDING THE SAME

(71) Applicant: KTL INTERNATIONAL CO., LTD., Taichung (TW)

(72) Inventors: Ying-Chieh Liao, Taichung (TW); Yu-Kuo Liao, Taichung (TW)

(73) Assignee: KTL INTERNATIONAL CO., LTD., Taichung (TW)

(*) Notice: Subject to any disclaimer, the term of this patent is extended or adjusted under 35 U.S.C. 154(b) by 448 days.

This patent is subject to a terminal disclaimer.

(21) Appl. No.: 16/440,680

(22) Filed: Jun. 13, 2019

(65) Prior Publication Data

US 2020/0391778 A1 Dec. 17, 2020

(51) Int. Cl.
*B62B 3/02* (2006.01)
*A47B 87/02* (2006.01)
*A47B 31/00* (2006.01)
*B62B 3/00* (2006.01)

(52) U.S. Cl.
CPC ............... *B62B 3/02* (2013.01); *A47B 31/00* (2013.01); *A47B 87/0223* (2013.01); *A47B 2031/004* (2013.01); *B62B 3/002* (2013.01)

(58) Field of Classification Search
CPC .............. A47B 31/00; A47B 87/0223; A47B 2031/004; A47B 47/00; A47B 47/045; A47B 47/0083; A47B 47/005; A47B 47/0033; A47B 47/0016; A47B 47/0008; A47B 2031/002; A47B 2031/003; B62B 3/02; B62B 3/002; B62B 2005/006
See application file for complete search history.

(56) References Cited

U.S. PATENT DOCUMENTS

| | | | | |
|---|---|---|---|---|
| 2,634,021 | A * | 4/1953 | Cella | B65D 15/24 206/512 |
| 4,644,876 | A * | 2/1987 | Thomas | A47B 13/06 108/154 |
| 4,998,023 | A * | 3/1991 | Kitts | A47B 31/00 211/188 |
| 5,433,326 | A * | 7/1995 | Horian | A47B 47/00 211/188 |
| 5,531,326 | A * | 7/1996 | Hummel | B65D 5/006 206/509 |
| D379,705 | S * | 6/1997 | Delmerico | D25/122 |
| D381,168 | S * | 7/1997 | Delmerico | D34/19 |
| 6,796,565 | B2 * | 9/2004 | Choi | B62B 3/02 211/188 |
| D612,153 | S * | 3/2010 | Liao | D3/304 |

(Continued)

*Primary Examiner* — Devin K Barnett
(74) *Attorney, Agent, or Firm* — Muncy, Geissler, Olds & Lowe, P.C.

(57) ABSTRACT

A shelf board is for being disposed on a cart including a plurality of column members and at least one decoration member. The shelf board includes a bottom board and a lateral wall. The lateral wall is connected to the bottom board to enclose a receiving space therebetween. The shelf board further has at least one engaging unit. The at least one engaging unit is adapted for connecting to a member for connecting. The member for connecting is one of the plurality of the column members or the at least one decoration member. A cart including the shelf board is also provided.

10 Claims, 9 Drawing Sheets

(56) References Cited

U.S. PATENT DOCUMENTS

| | | | | |
|---|---|---|---|---|
| D617,990 S * | 6/2010 | Liao | ............................. | D3/313 |
| D618,419 S * | 6/2010 | Catron | ........................... | D34/12 |
| 7,857,329 B2 * | 12/2010 | Cai | ........................... | B62B 3/04 |
| | | | | 280/47.35 |
| 8,690,471 B2 * | 4/2014 | Wians | ................... | A47F 5/0018 |
| | | | | 403/231 |
| 9,138,079 B2 * | 9/2015 | Su | ............................. | A47F 5/11 |
| D748,359 S * | 1/2016 | Lustig | ............................ | D34/21 |
| 9,266,547 B2 * | 2/2016 | Schumaker | ............ | A47B 31/00 |
| 9,522,690 B2 * | 12/2016 | Sabo | ...................... | A61B 50/10 |
| 9,538,846 B2 * | 1/2017 | Reinhart | ................ | A47B 96/02 |
| 9,975,565 B1 * | 5/2018 | Liao | .......................... | B62B 3/02 |
| D844,990 S * | 4/2019 | Liao | ............................. | D3/313 |
| 10,414,422 B2 * | 9/2019 | Choi | ........................ | B62B 9/12 |
| D887,664 S * | 6/2020 | Liao | ............................. | D34/27 |
| D916,413 S * | 4/2021 | Liao | ............................. | D34/27 |
| 2004/0227315 A1 * | 11/2004 | Van Landingham, Jr. | ................. | |
| | | | | B62B 5/06 |
| | | | | 280/47.35 |
| 2005/0062246 A1 * | 3/2005 | Kang | ...................... | B62B 3/006 |
| | | | | 280/47.35 |
| 2010/0071731 A1 * | 3/2010 | Liao | ......................... | B08B 3/08 |
| | | | | 134/104.2 |
| 2013/0033014 A1 * | 2/2013 | Yang | ......................... | B62B 3/10 |
| | | | | 280/47.35 |
| 2015/0048040 A1 * | 2/2015 | Chang | ................ | A47B 96/1416 |
| | | | | 211/126.16 |
| 2018/0146777 A1 * | 5/2018 | Henonin | ............ | A47B 87/0246 |
| 2019/0090662 A1 * | 3/2019 | Kelly | ..................... | A63H 33/28 |
| 2019/0111956 A1 * | 4/2019 | Phillips | ..................... | B62B 3/10 |
| 2020/0245760 A1 * | 8/2020 | Roberts | ................ | A47B 57/265 |
| 2020/0377135 A1 * | 12/2020 | Liao | ......................... | B62B 3/002 |
| 2020/0391778 A1 * | 12/2020 | Liao | ....................... | A47B 31/00 |

* cited by examiner

SHELF BOARD AND CART INCLUDING THE SAME

BACKGROUND OF THE INVENTION

Field of the Invention

The present invention relates to a shelf board and a cart having the shelf board.

Description of the Prior Art

When carrying heavy or large objects, or carrying objects during some works, it is difficult to carry by hands. A cart is usually used for carrying heavy or large objects, or carrying objects during works. Some carts have plural shelf boards for carrying more objects.

Some of the conventional carts have a structure which is unable to be dissembled, so more storage space is necessary for storing the carts. Some carts have a pivotable structure and are able to be folded for storage. Though storage space can be reduced, the structure of the cart is complicated to be easy to damage. Also, the cost is high, and manufacturing is difficult.

SUMMARY OF THE INVENTION

The main object of the present invention is to provide a shelf board alternatively connecting to the column member or the decoration member so that the shelf board can be arranged at any position. The cart can be quickly assembled or dissembled.

To achieve the above and other objects, the shelf board of the present invention is for being disposed on a cart including a plurality of column members and at least one decoration member. The shelf board includes a bottom board and a lateral wall. The lateral wall is connected to the bottom board to enclose a receiving space therebetween. The shelf board further has at least one engaging unit. The at least one engaging unit is adapted for connecting to a member for connecting. The member for connecting is one of the plurality of the column members or the at least one decoration member.

To achieve the above and other objects, the cart of the present invention includes two shelf boards mentioned above. The two shelf boards are arranged along an assembling direction. An upper one of the shelf boards is defined as a top shelf member. A lower one of the shelf boards is defined as a stacking shelf member. The cart further includes a plurality of column members and at least one decoration member. The column members are connecting the top shelf member and the stacking shelf member therebetween. An end of at least one of the column members is connected to the engaging unit of the stacking shelf member. The decoration member is disposed on the engaging unit of the top shelf member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
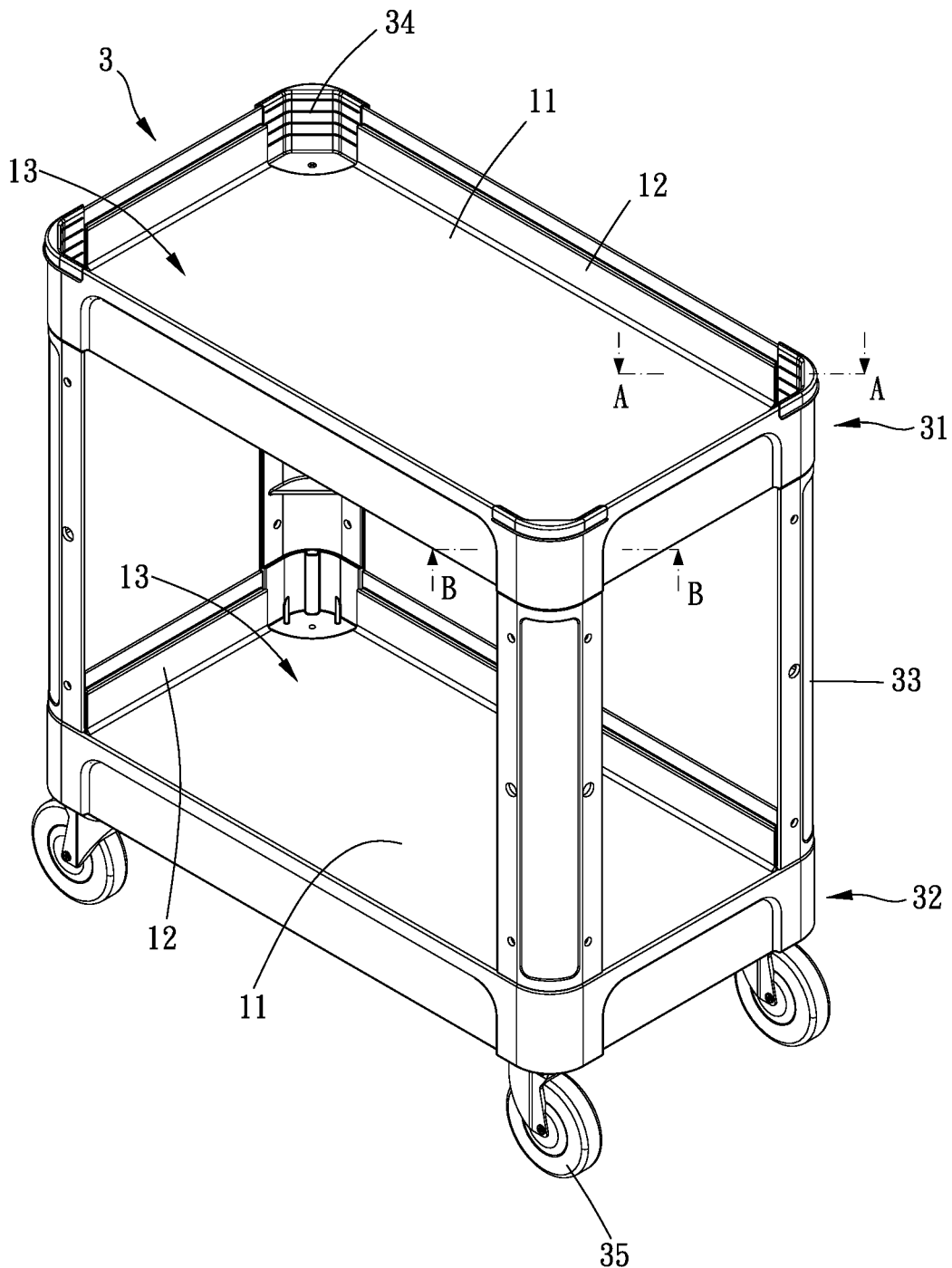
FIG. 1 is a stereogram showing a cart of the present invention.
Figure 2:
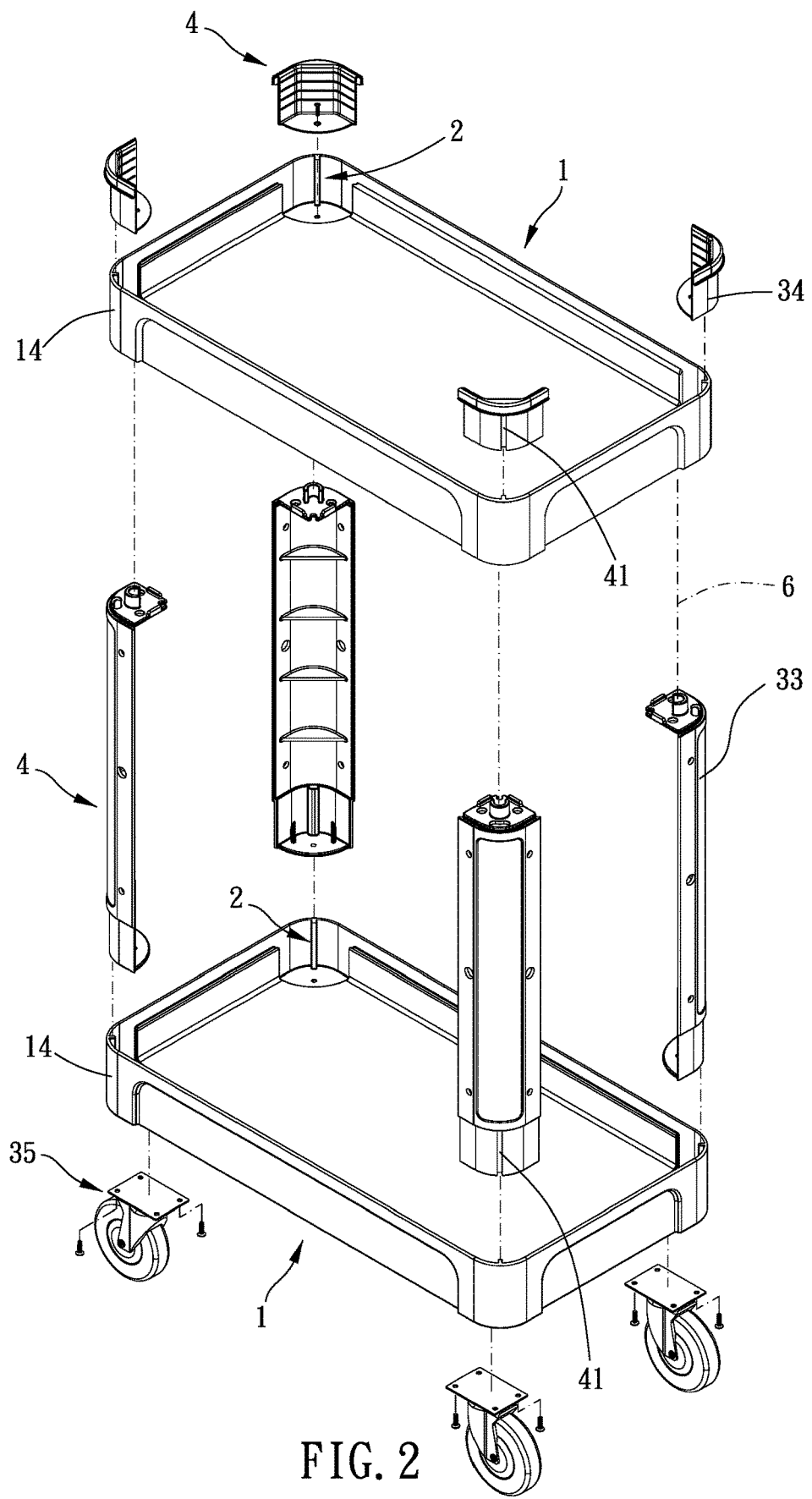
FIG. 2 is a breakdown drawing showing a cart of the present invention.
Figure 3:
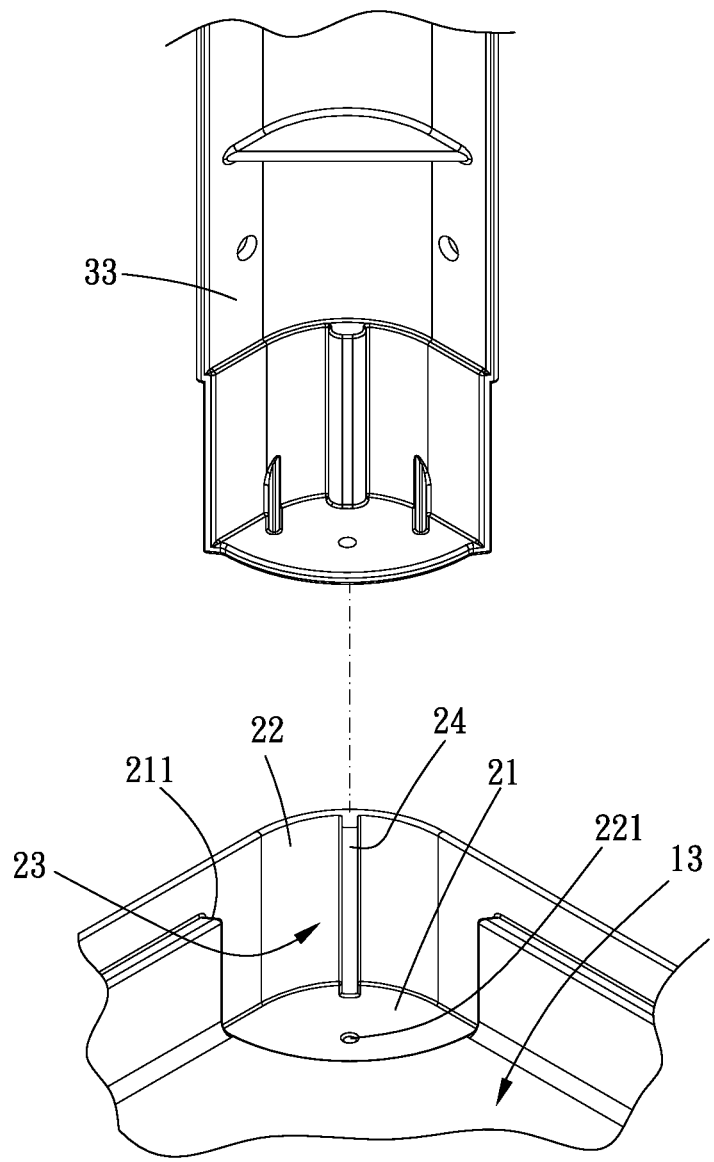
FIG. 3 is a partial enlargement showing a column member and a shelf member of the present invention.
Figure 4:
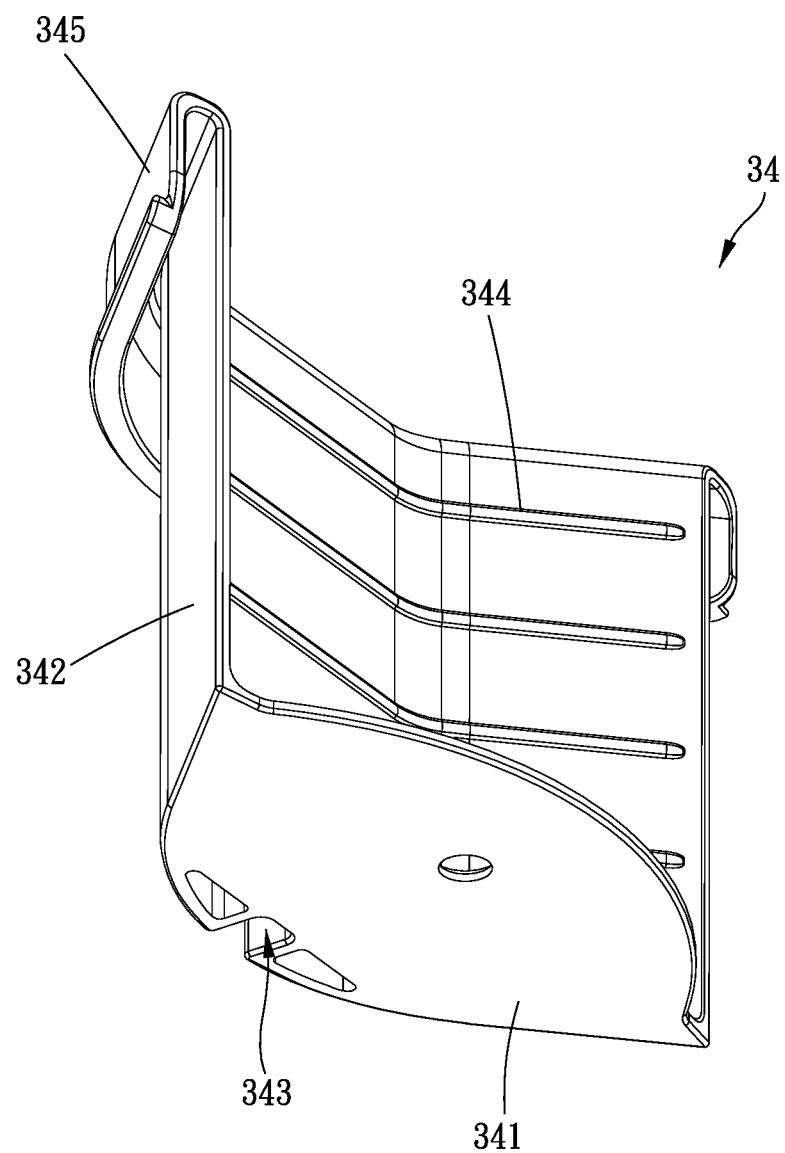
FIG. 4 is a stereogram showing a decoration member of the present invention.
Figure 5:
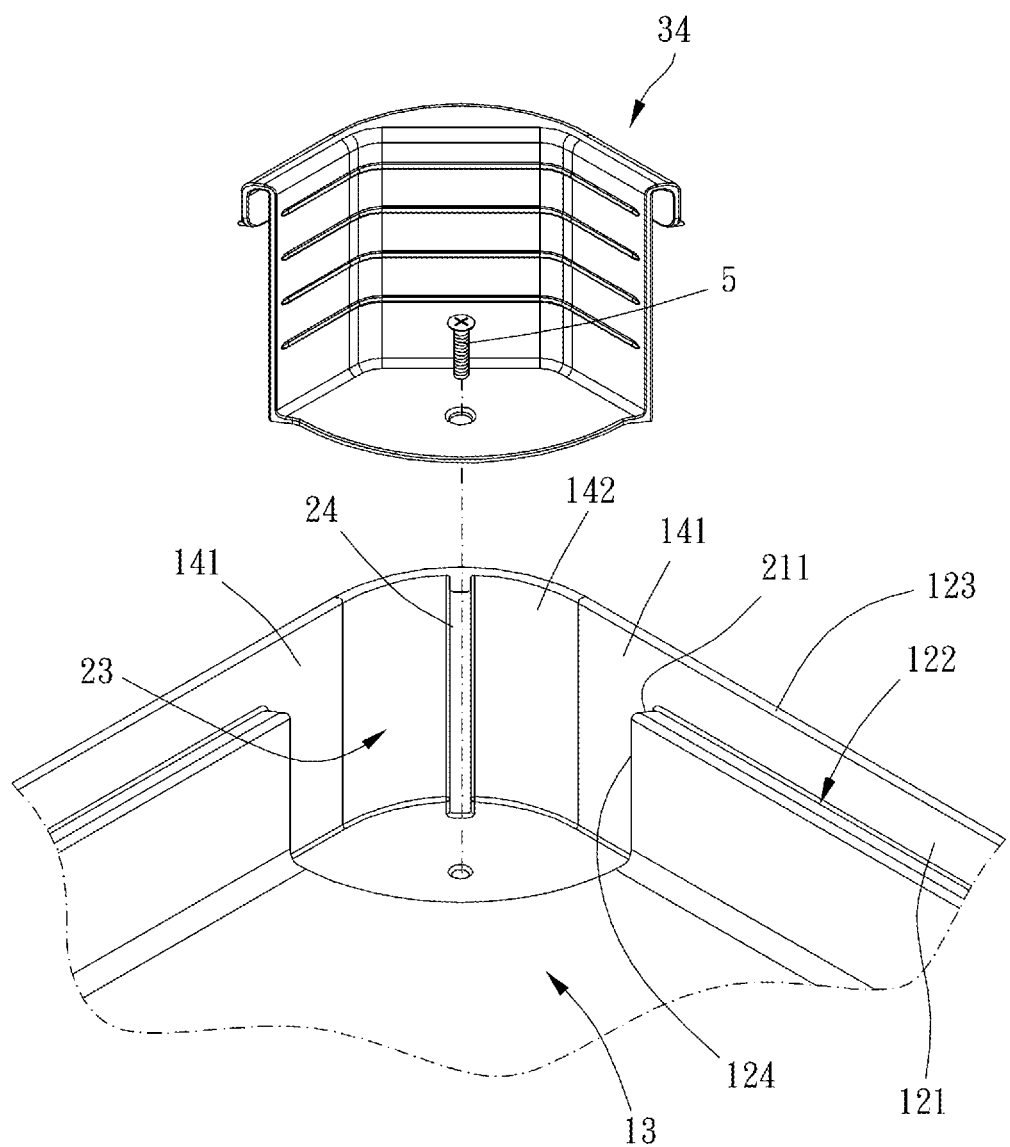
FIG. 5 is a partial enlargement showing a decoration member and a shelf member of the present invention.
Figure 6:
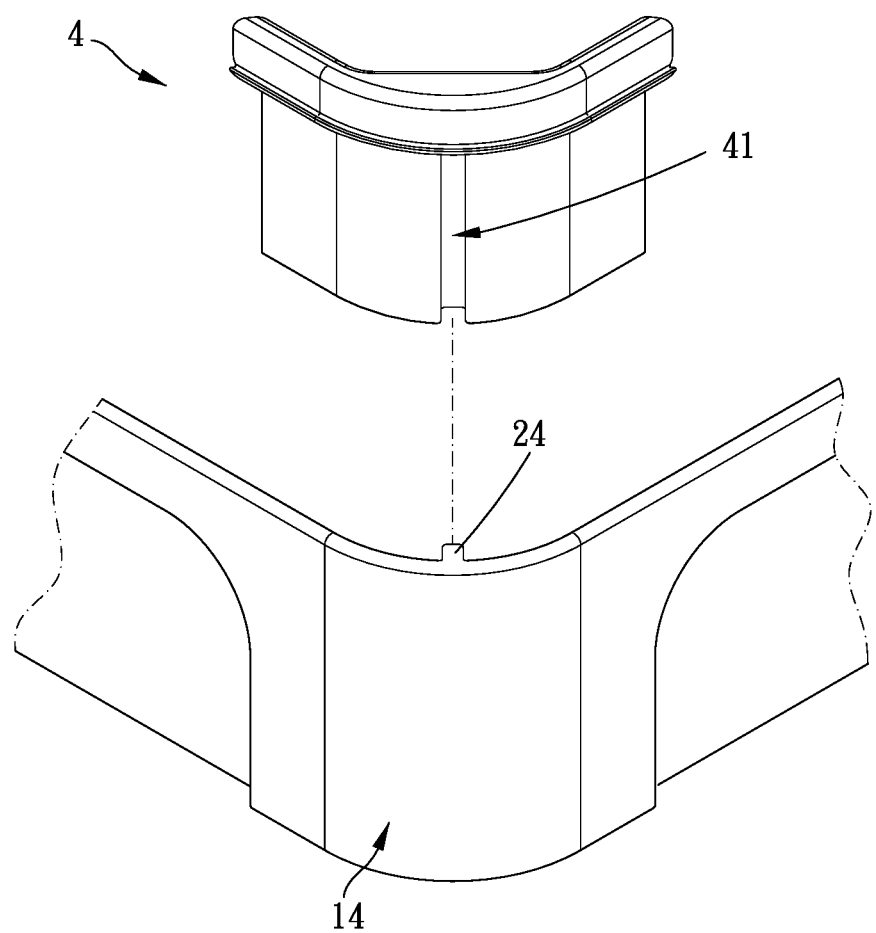
FIG. 6 is a partial enlargement showing a decoration member and a shelf member of the present invention at an other angle.
Figure 7:
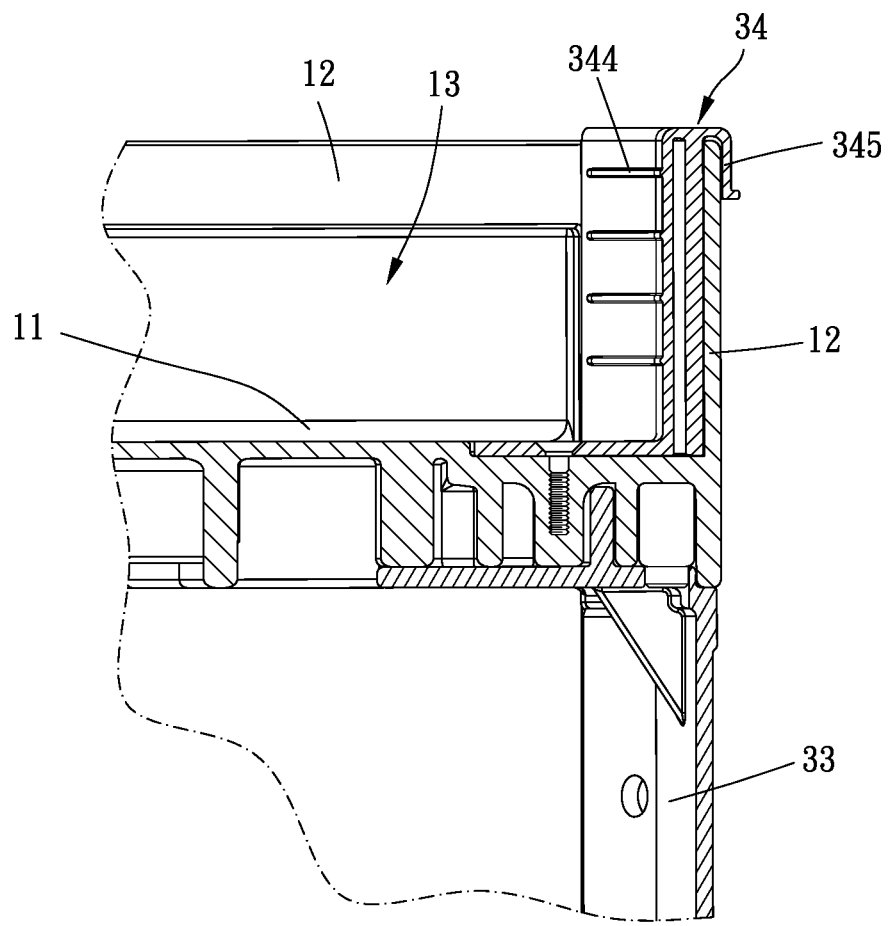
FIG. 7 is a partial enlargement of A-A cross-section.
Figure 8:
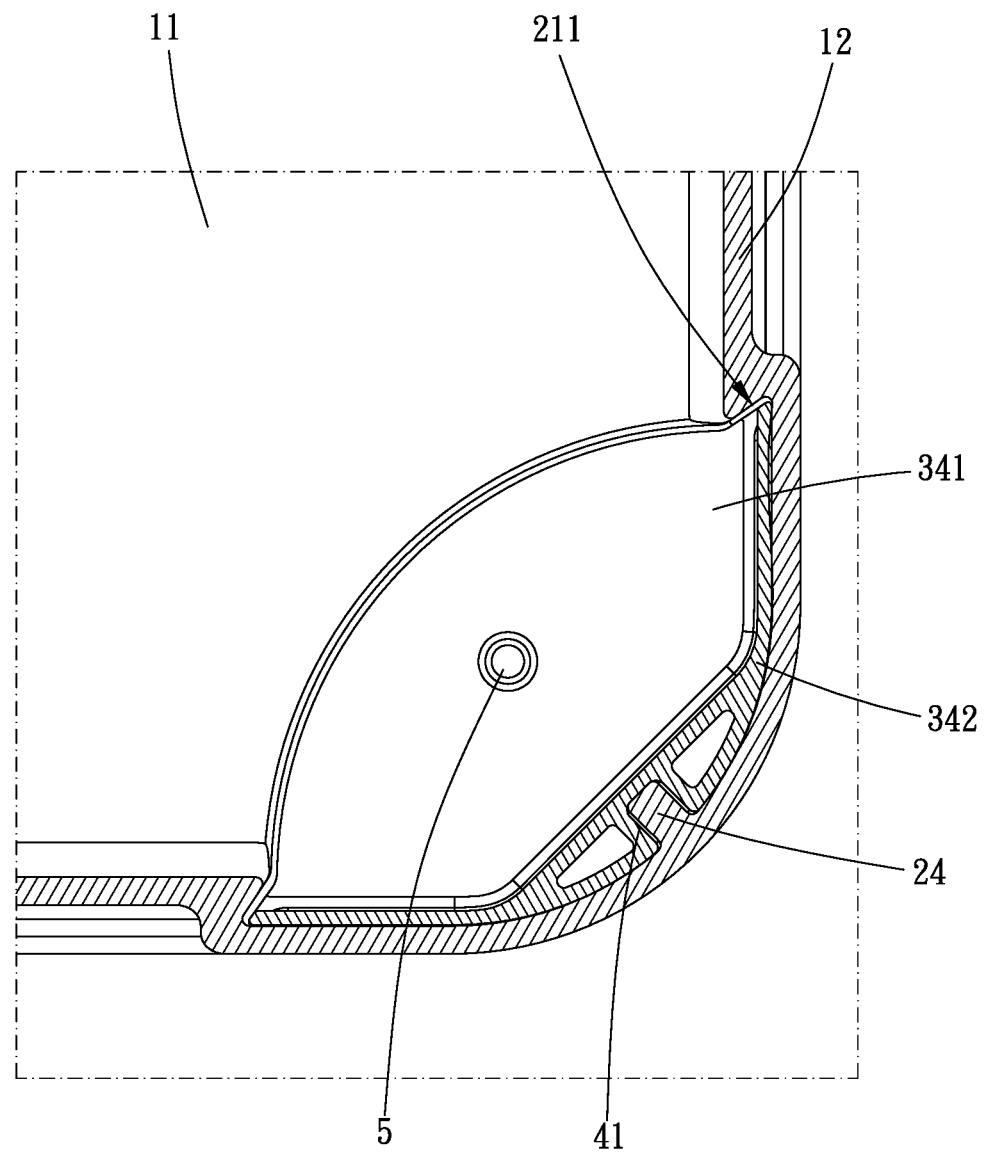
FIG. 8 is a partial enlargement of B-B cross-section.
Figure 9:
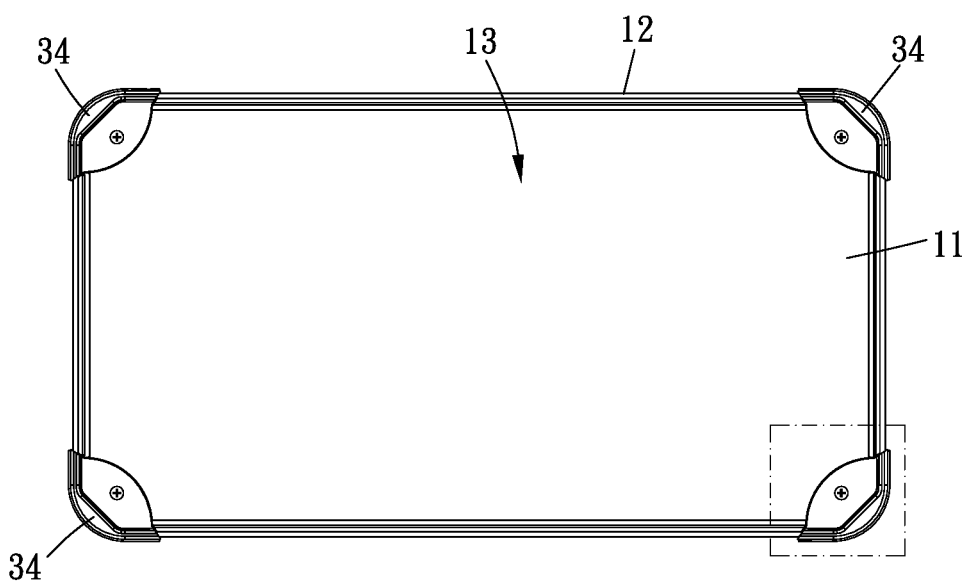
FIG. 9 is a top view of the present invention.
Figure 10:
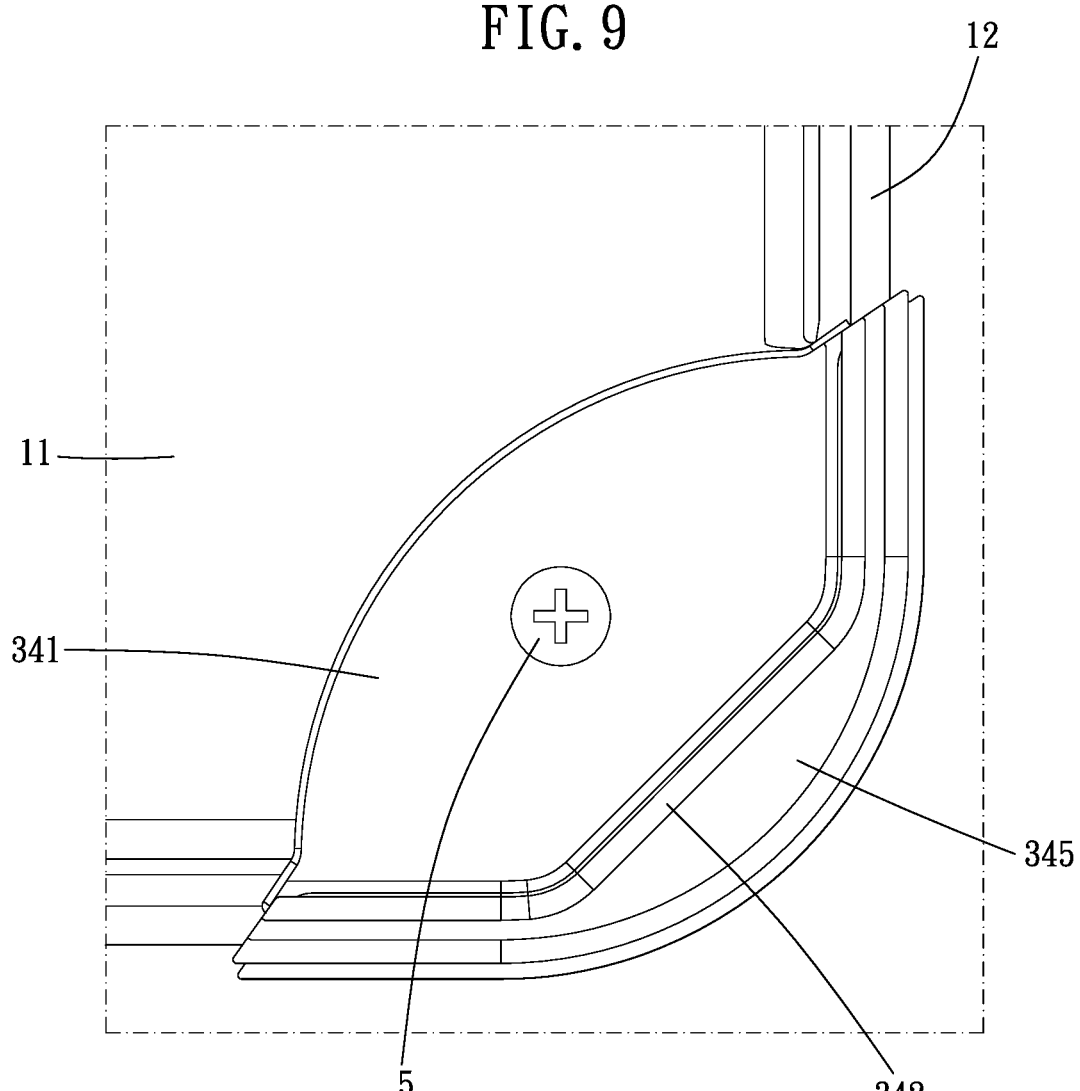
FIG. 10 is a partial enlargement of FIG. 9.

Please refer to FIG. 1 to FIG. 10, the shelf board 1 of the present embodiment is adapted for being disposed on a cart 3. The cart 3 includes a plurality of column members 33 and at least one decoration member 34. The shelf board 1 includes a bottom board 11 and a lateral wall 12. The lateral wall 12 is connected to the bottom board 11 to enclose a receiving space 13 therebetween. The shelf board 1 further has an engaging unit 2 for connecting to a member for connecting 4. The member for connecting 4 is one of the column member 33 or the at least one decoration member 34.

Specifically, the shelf board 1 can be connected to different objects (such as the column member 33 or the decoration member 34) via the at least one engaging unit 2 so as to form different parts of the cart 3 (such as the upper shelf or the lower shelf). Thereby, the user can change the position of the shelf board according to the needs. Because the shelf board can be used at any position, the cart can be assembled easily and quickly. In addition, the shelf board is beneficial for mass production. That is, when the shelf board 1 is connected to one of the column members 33, it can be used as the lower shelf of the cart 3. When the shelf board 1 is connected to the at least one decoration member 34, it can be used as a upper shelf of the cart 3.

Preferably, the engaging unit 2 is adapted for the member for connecting 4 to detachably connect thereto. Thereby, the cart 3 can be dissembled to the parts for storage or shipping. Besides, when some parts of the carts are damaged or lost, they can be exchanged to reduce cost.

The bottom board 11 and the lateral wall 12 form a plurality of corner portions 14. For example, the number of the corner portions 14 can be four, and each of the corner portions 14 has a right angle to fit the corner of wall. The at least one engaging unit 2 preferably includes a plurality of the engaging units 2 whose number is the same with that of the corner portions 14. The engaging units 2 are disposed on the corner portions 14 respectively. Thereby, when the engaging units 2 are connected with the column members 33, the column members 33 are located at the corner portions 14 of the shelf board 1 so as to enclose a larger contour. In addition, the column members 33 can protect the objects in the receiving space 13. Alternatively, the at least one decoration member 34 includes a plurality of the decoration members 34 whose number is the same with that of the corner portions 14. When the engaging units 2 are connected with the decoration members 34, the corner portions 14 can be protected by the decoration members 34.

Specifically, the at least one engaging unit 2 includes a first connection portion 21 and a second connection unit 22. The first connection portion 21 is recessedly formed on the bottom board 11, and the second connection portion 22 is recessedly formed on the lateral wall 12. The first connection portion 21 and the second connection portion 22 communicate each other to form an assembling space 23. The assembling space 23 communicates the receiving space 13 for alternatively receive the member for connecting 4. More specifically, the at least one engaging unit 2 further includes a first positioning portion 24, and the member for connecting 4 includes a second positioning portion 41. One of the first positioning portion 24 and the second positioning portion 41 is a protrusion, and the other one of the first positioning portion 24 and the second positioning portion 41 is a recess. The first positioning portion 24 and the second positioning portion 41 are engaged by the protrusion and the recess.

In the present embodiment, the first positioning portion 24 is an elongated rib. The first positioning portion 24 extends along the lateral wall 12 vertically. The second positioning portion 41 is a slot. The elongated rib is slidably inserted into the slot to abut against the slot laterally. Thereby, the member for connecting 4 is positioned on the shelf board 1 firmly.

Practically, the second connection portion 22 has two guiding grooves 211 on adjacent lateral wall 12. The two guiding grooves 211 are adapted for the member for connecting 4 to partially insert in so that the member for connecting 4 can be restricted by the lateral wall 12. Thereby, the member for connecting 4 is positioned on the shelf board 1 more firmly. Specifically, each of the guiding grooves 211 is a dovetail groove to efficiently restrict the member for connecting 4.

More specifically, the conjunction between the first connection portion 21 and the bottom board 11 has an arc-shaped contour. The second connection portion 22 includes two linear sections 141 and an arc section 142. The first positioning portion 24 is located at the center of the arc section 142. The two guiding grooves 211 are located at the two linear sections 141 respectively. The lateral wall 12 includes four side walls 121 and four ledges 122 which are lower than a top end 123 of the lateral wall 12 relative to the bottom board 11, and each of the four ledges 122 projects toward one another. The two guiding grooves 211 are located at ends 124 of two of the four ledges 122, respectively.

Preferably, the first connection portion 21 is formed with a connection hole 221 for a fixing member 5 to insert after the fixing member 5 penetrates the member for connecting 4. Thereby, the member for connecting 4 is further positioned on the shelf board 1. In the present embodiment, the connection hole 221 is located at an extension direction of the thickness of the first positioning portion 24.

A cart 3 of the present invention includes two said shelf boards 1. The two shelf boards 1 are arranged along an assembling direction 6. The upper shelf board 1 is defined as a top shelf member 31, and the lower shelf board 1 is defined as a stacking shelf member 32. The cart 3 further includes a plurality of said column members 33 and at least one said decoration member 34.

The column member 33 connects the top shelf member 31 and the stacking shelf member 32 therebetween. An end of at least one of the column members 33 is connected to the engaging unit 2 of the stacking shelf member 32. The at least one decoration member 34 is connected to the engaging member 2 of the top shelf member 31. In the present embodiment, the column members 33 are all connected to the engaging unit 2 of the stacking shelf member 2 and located at the corner portions 14 of the stacking shelf member 32. The at least one decoration member 34 includes a plurality of the decoration members 34 whose number is the same with the number of the corner portions 14. The decoration members 34 are located at the corner portions 14 of the top shelf member 31.

In addition, the cart 3 further has a plurality of wheels 35 disposed on a side of the stacking shelf member 32 opposite to the top shelf member 31. Thereby, the cart 3 can be easily moved by pushing.

Specifically, the at least one decoration member 34 includes a first abutting portion 341, a second abutting portion 342, and a notch 343 connected together. The first abutting portion 341 is adapted for abutting against the bottom board 11. The second abutting portion 342 is adapted for abutting against the lateral wall 12. The notch 343 is formed on the second abutting portion 342 and penetrates the first abutting portion 341. That is, the first abutting portion 341 abuts against the bottom board 11 by connecting to the first connection portion 21, and the second abutting portion 342 abuts against the lateral wall 12 by connecting to the second connection portion 22. The notch 343 is served as the second positioning portion 41, and the elongated rib is served as the first positioning portion 24 to slidably inserted into the notch 343.

More specifically, when the at least one decoration member 34 is connected to the engaging unit 2 of the top shelf member 2, the first abutting portion 341 is flush with the bottom board 11 of the top shelf member 31, the second abutting portion 342 extends not over the lateral wall 12. An end of at least one of the column members 33 has the similar structure mentioned above so as to connect to at least one engaging unit 2.

Preferably, the at least one decoration member 34 further has a hook portion 345 for hooking onto the top of the lateral wall 12 to protect the lateral wall so that the at least one decoration member 34 can be positioned on the shelf board 1 firmly.

More preferably, the at least one decoration member 34 has a color different from the color of the shelf board 1 to emphasize the position of the corner portion 14 of the top shelf member 31. Also, different colors can be used for different users or purposes. Besides, the column members 33 have the same color with the shelf board 1 to make the cart look consistent.

More preferably, the column members 33 extend not over the lateral wall 12 of the stacking shelf member 32 along a direction perpendicular to the assembling direction 6 to have a consistent larger contour to align with other objects or another cart 3.

More preferably, the at least one decoration member 34 has a plurality of ribs 344 at the second abutting portion 342. Because the at least one decoration member 34 is located at the corner portion 14 of the top shelf member 31, the ribs 344 increases the contact area with the hands of the user for firmly gripping.

In conclusion, the engaging units of the shelf boards can be connected by the column member or the decoration member, so the shelf board can be used as the top shelf member or the stacking shelf member. Thus, the cart can be easily manufactured and assembled.

What is claimed is:

1. A shelf board for being disposed on a cart, the cart including a plurality of column members and at least one decoration member, the shelf board including a bottom board and a lateral wall, the lateral wall being connected to the bottom board to enclose a receiving space therebetween, the shelf board further having at least one engaging unit, the at least one engaging unit is configured for connecting to a member for connecting, the member for connecting being one of the plurality of the column members or the at least one decoration member;
- wherein the lateral wall includes four side walls and four ledges which are lower than a top end of the lateral wall relative to the bottom board, and each of the four ledges projects toward one another;
- wherein the at least one engaging unit includes two guiding grooves on the lateral wall, the two guiding grooves are located at ends of two of the four ledges respectively and configured for part of the member for connecting to be slidably arranged therein, and each of the two guiding grooves is a dovetail groove.

2. The shelf board of claim 1, wherein the bottom board and the lateral wall form a plurality of corner portions, the at least one engaging unit includes a plurality of units whose number is the same with that of the plurality of corner portions, the plurality of engaging units are disposed on the corner portions respectively.

3. The shelf board of claim 1, wherein the at least one engaging unit includes a first connection portion and a second connection portion, the first connection portion is recessedly formed on the bottom board, the second connection portion is recessedly formed on the lateral wall, the first connection portion and the second connection portion communicate each other to form a connection space, the connection space communicates the receiving space to optionally receive the member for connecting.

4. The shelf board of claim 3, wherein the at least one engaging unit further includes a first positioning portion, the member for connecting further includes a second positioning portion, one of the first positioning portion and the second positioning portion is a protrusion, an other one of the first positioning portion and the second positioning portion is a recess, the protrusion is engaged in the recess.

5. The shelf board of claim 3, wherein the second connection portion has the two guiding grooves.

6. The shelf board of claim 4, wherein the bottom board and the lateral wall form a plurality of corner portions, the at least one engaging unit includes a plurality of engaging units whose number is the same with that of the plurality of corner portions, the plurality of engaging units are disposed on the corner portions respectively; the first positioning portion is a rib, the second positioning portion is a slot, the rib is sldiably inserted into the slot and fits the slot laterally; a connection hole is formed at the first connection portion, the connection hole is adapted for a fixing member to insert in and fix to after the fixing member inserted through the member for connecting; the plurality of corner portions includes four said corner portions; the second connection portion includes two linear sections and an arc section, the first positioning portion is located at a center of the arc section, the two guiding grooves are located at the two linear sections respectively; a junction between the first connection portion and the bottom board has an arc-shaped contour; the connection hole is located at an extension direction of a thickness of the first positioning portion; the at least one engaging unit is adapted for the member for connecting to detachably engage and fix thereto.

7. A cart comprising:
- a plurality of column members and at least one decoration member;
- two shelf boards are disposed on the cart each shelf board comprises:
  - a bottom board and a lateral wall, the lateral wall being connected to the bottom board to enclose a receiving space therebetween;
  - at least one engaging unit, the at least one engaging unit is configured for connecting to a member for connecting, the member for connecting being one of the plurality of the column members or the at least one decoration member;
  - wherein the lateral wall includes four side walls and four ledges which are lower than a top end of the lateral wall relative to the bottom board, and each of the four ledges projects toward one another;
  - wherein the at least one engaging unit includes two guiding grooves on the lateral wall, the two guiding grooves are located at ends of two of the four ledges respectively and configured for part of the member for connecting to be slidably arranged therein, and each of the two guiding grooves is a dovetail groove;
- the two shelf boards being arranged along an assembling direction, an upper one of the two shelf boards being defined as a top shelf member, a lower one of the two shelf boards being defined as a stacking shelf member;
- the plurality of column members connects the top shelf member and the stacking shelf member therebetween, an end of at least one of the column members being connected to the at least one engaging unit of the stacking shelf member;
- the at least one decoration member is disposed on the at least one engaging unit of the top shelf member.

8. The cart of claim 7, wherein the at least one decoration member has a first abutting portion, a second abutting portion, and a notch, the first abutting portion is adapted for abutting against the bottom board, the second abutting portion is adapted for abutting against the lateral wall, the notch is formed on the second abutting portion and is configured to penetrate the first abutting portion.

9. The cart of claim 8, wherein the at least one decoration member further includes a hook portion for hooking onto the top end of the lateral wall.

10. The cart of claim 9, wherein the at least one decoration member has a color different from a color of the shelf boards, the column members have a color different from the color of the shelf boards; the cart further includes a plurality of wheels, the wheels are disposed on a side of the stacking shelf member opposite to the top shelf member.

* * * * *